United States Patent [19]

Huang

[11] Patent Number: 5,113,301

[45] Date of Patent: May 12, 1992

[54] STRUCTURE OF TAPE PLAYER/RECORDER MAGNETIC HEAD CLEANER

[76] Inventor: Ku-Di Huang, 2 Fl., Alley 44, Lane 148, Pi Hua St., San Chung, Taiwan

[21] Appl. No.: 621,964

[22] Filed: Dec. 4, 1990

[51] Int. Cl.[5] .............................................. G11B 5/41
[52] U.S. Cl. ........................................................ 360/128
[58] Field of Search ................................ 360/128, 137; 15/DIG. 12, DIG. 13, 210 R

[56] References Cited

U.S. PATENT DOCUMENTS

| | | | |
|---|---|---|---|
| 4,378,582 | 3/1983 | Maier et al. | 360/128 |
| 4,698,712 | 10/1987 | Fritsch | 360/128 |
| 4,849,843 | 7/1989 | Fujita et al. | 360/128 |

FOREIGN PATENT DOCUMENTS

| | | | |
|---|---|---|---|
| 0309398 | 3/1989 | European Pat. Off. | 360/128 |
| 2232000 | 11/1990 | United Kingdom | 360/128 |

Primary Examiner—David J. Severin
Attorney, Agent, or Firm—Fleit, Jacobson, Cohn, Price, Holman & Stern

[57] ABSTRACT

A tape player/recorder magnetic head cleaner, comprising two driving gear wheels respectively carried to rotate by the tape take-up reel and tape supply reel of the tape player/recorder; an endless belt mounted on said two driving gear wheels for synchronous motion; an elastic frame having a neck portion at the top for holding a cleaning head and two elongated slots longitudinally disposed at two opposite end for fastening the two eccentric columns made on said two driving gear wheels, permitting said cleaning head to be carried to alternatively move left and side while rubbing on the surface of the magnetic head.

4 Claims, 3 Drawing Sheets 5,113,301

STRUCTURE OF TAPE PLAYER/RECORDER MAGNETIC HEAD CLEANER

BACKGROUND OF THE INVENTION

The present invention relates to a structure of tape player/recorder magnetic head cleaner which can be alternatively arranged for cleaning the magnetic head only, or for cleaning the magnetic head and erasing the residual magnetism simultaneously.

In the conventional structure of tape player/recorder magnetic head cleaner, a plurality of gear sets are used to drive a belt to make a reciprocating motion so as to carry a cleaning head to rub on the surface of the magnetic head. Because numerous parts are used, the manufacturing process of the conventional tape player/recorder magnetic head cleaner is rather complicated and expensive. Further, the cleaner can only be used for removing dirt from the magnetic head. For removing the residual magnetism from the magnetic head of a tape player/recorder, a magnetic eraser shall be required.

SUMMARY OF THE INVENTION

The present invention has been accomplished under the circumstances in view. It is, therefore, an object of the present invention to provide a tape player/recorder magnetic head cleaner which is simple in structure, practical in use, easy and inexpensive to manufacture.

It is another object of the present invention to provide a tape player/recorder magnetic head cleaner which can be alternatively arranged for cleaning the magnetic head only, or for cleaning the magnetic head and erasing the residual magnetism simultaneously.

To achieve the above objects, there is provided a tape player/recorder magnetic head cleaner comprising a casing having fastened therein two driving gear wheels, which are respectively carried to rotate by the tape take-up reel and the tape supply reel of the tape player/recorder and have each a column disposed at an eccentric position, an end less belt, which is mounted on said two driving gear wheels for synchronous motion, an elastic frame made of a resilient plastic strip bent into a substantially egg-shaped structure, which has a neck portion at the top with two opposite holes made at the inner side and two elongated slots longitudinally disposed at the two opposite ends thereof for inserting said columns, and a cleaning head, which has two side ribs respectively fastened in said two opposite holes. The two columns of the two driving gear wheels are carried to make a circular motion during the rotary motion of the two driving gear wheels, so as to drive the elastic frame to alternatively move left and right, and therefore, the cleaning head on the elastic frame is simultaneously moved to rub on the surface of the magnetic head for removing dirt therefrom.

DETAILED DESCRIPTION OF THE PREFERRED EMBODIMENTS

Figure 1:
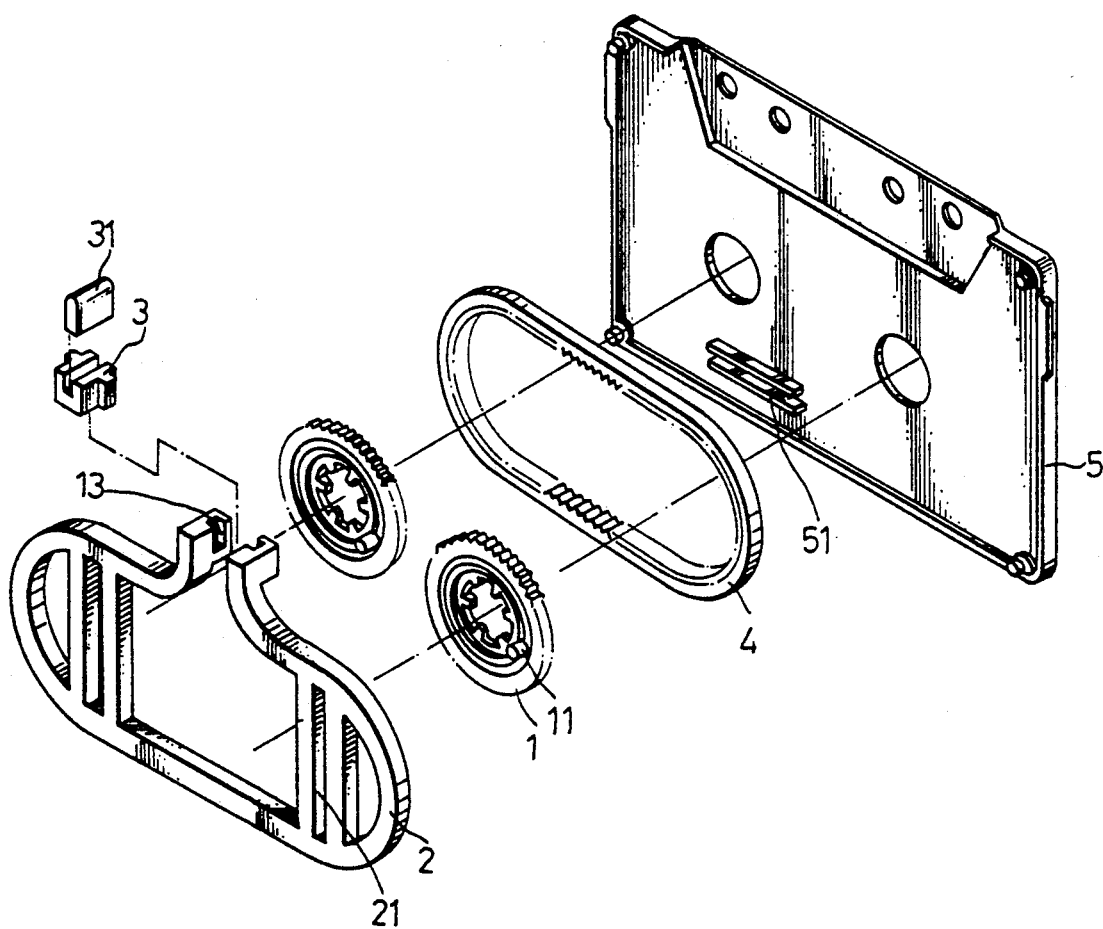
FIG. 1 is a perspective dismantled view of the preferred embodiment of the present invention.

Referring to FIG. 1, a tape player/recorder magnetic head cleaner in accordance with the present invention is generally comprised of a casing 5 having fastened therein two driving gears 1, an elastic frame 2, a cleaning head 3 and an endless belt 4. The two driving gears 1 have each a column 11 disposed at an eccentric position. The endless belt 4 is mounted on the two driving gears 1 and driven to make a synchronous motion. The elastic frame 2 is a substantially egg-shaped member having a neck portion 12 at the top defining therein an opening for mounting the cleaning head 3, and two elongated slots 21 at the two opposite ends thereof for inserting the columns 11 of the two driving gears 1, wherein the neck portion 12 has two opposite holes 13 at the inner side for inserting the two opposite ribs of the cleaning head 3 permitting the cleaning head 3 to be firmly retained in the neck portion 12 of the elastic frame 2.

Figure 2:
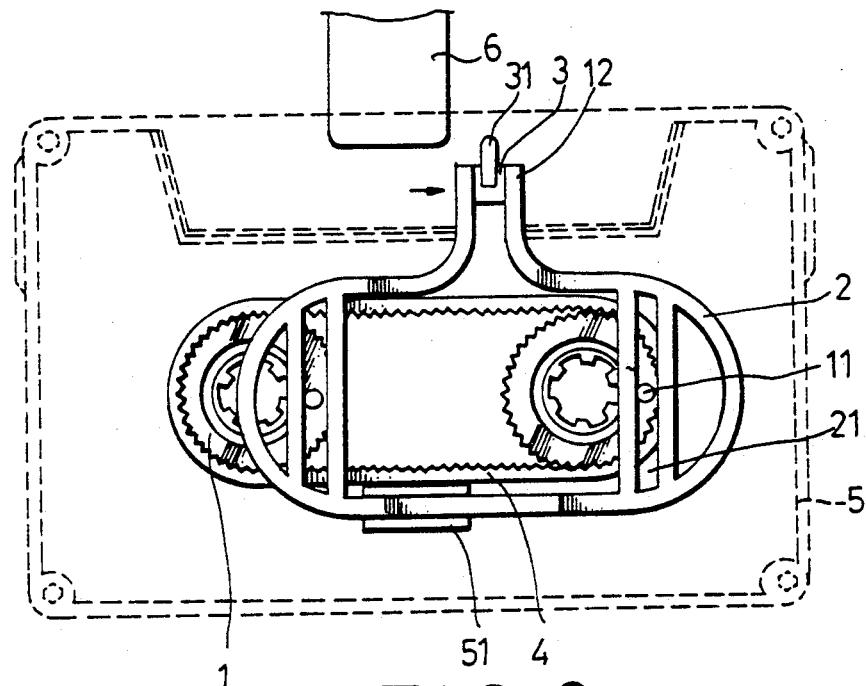
FIG. 2 is a plan view illustrating the operation of the present invention, in which the cleaning head is moved from the left to the right.
Figure 3:
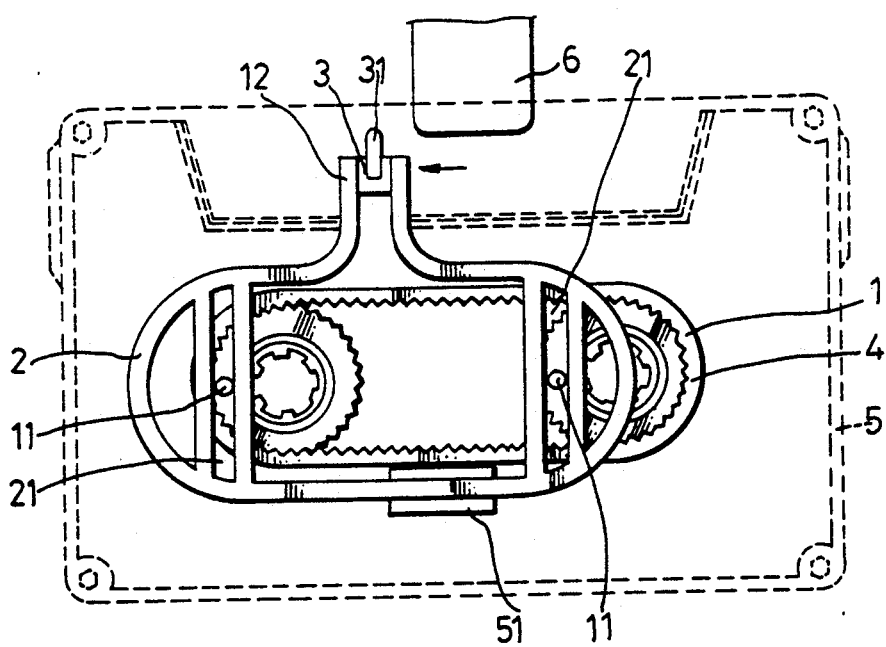
FIG. 3 is another plan view illustrating the operation of the present invention, in which the cleaning head it moved from the right to the left.

Referring to FIGS. 2 and 3, when the two driving gears 1 are driven to rotate during cleaning mode, the two columns 11 are simultaneously carried to make circular motion. Because the two columns 11 of the two driving gears 1 are respectively inserted in the two elongated slots 21 of the elastic frame 2, the elastic frame 2 will be simultaneously carried to move alternatively left and right. By means of the confinement of the locating block 51 which is fastened in the casing 5 at a suitable location, the elastic frame 2 is guided to stably make a reciprocating motion. During the reciprocating motion of the elastic frame 2, the cleaning head 3 is simultaneously carried to rub on the surface of the magnetic head 6.

According to the present invention, the elastic frame 2 is made of plastic material having suitable resilient property so that the magnetic head 6 will not be damaged during rubbing of the cleaning head 3.

Figure 4:
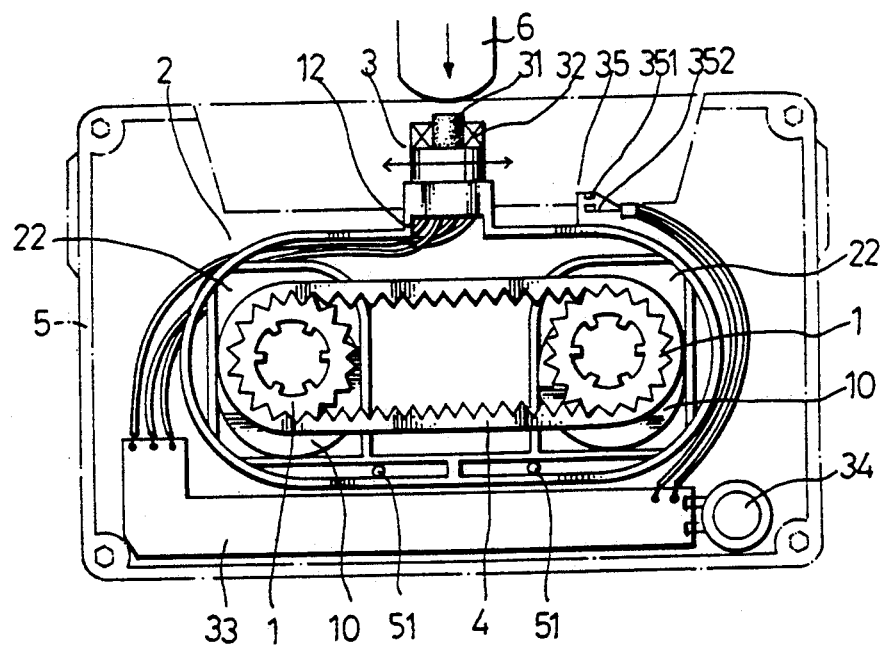
FIG. 4 illustrates an alternate form of the present invention.

Referring to FIG. 4, there is illustrates an alternate form of the present invention. In this embodiment, the two driving gears 1 having each an eccentric circle means 10 respectively engaged in the two square holes 22 at the two opposite ends of the elastic frame 2. By means of the guidance of the two locating posts 51 on the casing 5, the elastic frame 2 is stably carried by the two driving gears 1 to alternatively move left and right. The cleaning head 3 has cleaning cotton 31 and magnetic eraser 32 fastened therein, wherein the magnetic eraser 32 is electrically connected to a PC board 33 and a battery set 34 via a spring switch 35 which is mounted on the elastic frame 2. When the elastic frame 2 is forced inwards by the magnetic head 6 during its reciprocating motion, the upper strip spring 351 of the spring switch 35 is squeezed downward to contact the lower strip spring 352 permitting the magnetic eraser 32 to be electrically connected to the PC board 33 and the battery set 34. Therefore, the cleaning head 3 is carried to remove dirt and residual magnetism from the magnetic head 6 (as shown in FIG. 4).

I claim:

1. A tape player/recorder magnetic head cleaner comprising a casing having fastened therein:
   two driving gear wheels respectively mounted on a tape take-up reel base and a tape supply reel base of a tape player/recorder to be cleaned having each a column disposed at an eccentric position:

an endless belt driven by said driving gear wheels to make a synchronous motion:

an elastic frame being a substantially egg-shaped member having a neck portion at the top of said elastic frame, two elongated slots longitudinally at two opposite ends of said elastic frame for inserting said column:

a cleaning head for holding at least one cleaning element, having side ribs respectively fastened in said neck portion of said elastic frame: and wherein rotation of said two driving gear wheels drives said column to carry said elastic frame to alternatively stably move left and right by means of the guidance of a locating block made inside said casing, so as to carry said cleaning head to remove dirt from the magnetic head of the tape player/recorder into which the cleaner is inserted.

2. The tape player/recorder magnetic head cleaner of claim 1, wherein said driving gear wheels have each an eccentric circle means respectively fastened in two square holes made on said elastic frame at the two opposite ends of said elastic frame, for driving said elastic frame to alternatively move left and right.

3. The tape player/recorder magnetic head cleaner of claim 1, wherein said cleaning head has cleaning cotton and magnetic eraser means fastened therein for removing dirt and residual magnetism from said magnetic head, said magnetic eraser means connected to a control circuit board and a battery set inside said casing through a spring switch mounted on said elastic frame at the top of said elastic frame.

4. The tape player/recorder magnetic head cleaner of claim 1, wherein said neck portion has a neck portion at the top or said elastic frame for holding said cleaning head, said neck portion comprised of two opposite strips having each a hole at the inner side of said strip for fastening the side ribs of said cleaning head.

* * * * *